(12) United States Patent
De Pauw et al.

(10) Patent No.: US 6,219,826 B1
(45) Date of Patent: *Apr. 17, 2001

(54) VISUALIZING EXECUTION PATTERNS IN OBJECT-ORIENTED PROGRAMS

(75) Inventors: Wim De Pauw, Scarborough; John Matthew Vlissides, Mohegan Lake, both of NY (US); David Hod Lorenz, Haifa (IL); Mark N. Wegman, Ossining, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/690,960

(22) Filed: Aug. 1, 1996

(51) Int. Cl.[7] .................................................. G06F 9/45
(52) U.S. Cl. ................................. 717/4; 709/315
(58) Field of Search ................................... 395/703, 704, 395/680, 683; 709/310, 315, 323; 717/1, 2, 3, 4

(56) References Cited

U.S. PATENT DOCUMENTS 4,885,717 * 12/1989 Beck et al. ........................... 395/704

OTHER PUBLICATIONS

Tomisha Kamada, Satoru Kawa; A General Framework for Vizualizing Abstract Objects and Relations, ACM Transaction on Graphics, vol.10, No. 1, Jan. 1991.*

Patrick Brown, Thomas Gargiulo, An Object Oriented Layout for Directed Graphs, IEEE, 1992.*

Wim DePauw, Richard Helm, Doug Kimelman, John Vlissides, Visualizing the Behavior of Object–Oriented Systems, OOPLAS 1993, ACM/SIGPLAM, sec. 1–9, Oct. 1993.*

Roman, G.C., Cox, K.C., A Taxonomy of Program Visualization Systems, IEEE Computing Soceity, p. 11–24, Dec. 1993.*

(List continued on next page.)

Primary Examiner—Alvin E. Oberley
Assistant Examiner—Peter Stecher
(74) Attorney, Agent, or Firm—Ratner & Prestia

(57) ABSTRACT

An improved method and system for visualizing an object-oriented program's execution in a manner that facilitates understanding, debugging, and tuning programs of arbitrary size and complexity by visually depicting a sequence of one or more messages to an object or between objects as a tree. Each node in the tree represents an object, and each edge represents a message between the objects. To manage the complexity of what is displayed, the user may elect to collapse subtrees so that they appear in abbreviated form. The user may expand collapsed subtrees so that they are visible in full. By selectively expanding and collapsing subtrees, the user can examine only those parts of the execution that are immediately relevant. The user may specify additional criteria for classifying subtrees, i.e., the conditions under which two subtrees are deemed equivalent. The system can then consolidate equivalent subtrees automatically, replacing them with a more general execution pattern that subsumes them all. Furthermore, an execution pattern can be augmented with summary (e.g., performance or complexity) information. This summary information reflects characteristics of the message sequences, for example, the resource usage they incur, or a measure of their complexity. Preferably, the summary information is superimposed graphically on the execution pattern's graphical rendition.

49 Claims, 19 Drawing Sheets

OTHER PUBLICATIONS

Moher, T.G., Provide: A Process Visualization and Debugging Enivironment, Software Engineering, IEEE Transaction, p. 849–857, Jun. 1988.*

Jerding et al.. Visualizing Message Patterns in Object Oriented Prgram Executions, Technical Report, GIT–GVU–96–15, May, 1996, p. 1–10.*

H. D. Böcker et al., "Browsing Through Program Execution", Interact'90, pp. 991–996, 1990.

W. Cunningham et al., "A Diagram for Object–Oriented Programs", Object–Oriented Programming Systems, Languages and Applications Conference, pp. 361–367, Sep., 1986.

V. Haarslev et al., "A Framework for Visualizing Object–Oriented Systems", ACM OOPSLA/ECOOP '90, Conference Proceedings, pp. 237–244, Oct. 21–25, 1990.

IBM, "Visual Age C++", http://www.software.hosting.ibm.com/ad/cset/csetos2/wpl–fam.html. 2 pages. May 2, 2000.

IBM, "VisualAge Smalltalk" http://www.software.hosting.ibm.com/software/ad/vastub.html, 2 pages, May 2, 2000.

M. F. Kleyn et al., "GraphTrace –Understand Object–Oriented Systems Using Concurrently Animated Views", Object–Oriented Programming Systems, Languages and Applications Conference, pp. 191–205, Sep. 25–30, 1988.

D.B. Lange et al., "Interactive Visualization of Design Patterns Can Help in Framework Understanding", Object–Oriented Programming Systems, Languages and Applications Conference, pp. 342–357, 1995.

W. De Pauw et al., "Visualizing the Behavior of Object–Oriented Systems", Object–Oriented Programming Systems, Languages and Applications Conference, pp. 326–337, 1993.

W. De Pauw et al., "Modeling Object–Oriented Program Execution", European Conference on Object–Oriented Programming, pp. 163–182, 1994.

Dean F. Jerding et al., "Visualizing Message Patterns in Object–Oriented Program Executions", Graphics, Visualization, and Usability Center, Georgia Institute of Technology, Atlanta, GA, Technical Report GIT–GVU–96–15, May, 1996, 21 pages.

Wim De Pauw et al., "Execution Patterns in Object–Oriented Visualization", Submitted to OOPSLA '96, 13 pages, 1996.

D. B. Lange et al., Interactive Visualization of Design Patterns Can Help in Framework Understanding, OOPSLA '95, Austin, TX, USA., pp. 342–357, 1995.

K. Koskimies et al., "Viewing Object–Oriented Programs through Scenario Diagrams", 8 pages, Jun. 1995.

I. Jacobson et al., "Object–Oriented Software Engineering——A Use Case Driven Approach", pp. 147–148, Addison–Wesley, Wokingham, England, 1992.

* cited by examiner

Class_infoTable::Register(const char+): 633 occurences, total CPU time: 0.7698+1ms, complexity 3

VISUALIZING EXECUTION PATTERNS IN OBJECT-ORIENTED PROGRAMS

CROSS-REFERENCE TO RELATED APPLICATIONS

The present application is related in subject matter to co-pending U.S. patent application Ser. No. 08/431,226, filed Apr. 28, 1995, entitled Storing and Querying Execution Information for Object-Oriented Programs, by W. De Pauw et al., commonly assigned to the assignee of the present application, which co-pending application is hereby incorporated by reference in its entirety.

FIELD OF THE INVENTION

This invention relates to the field of object-oriented programming. More specifically, it is related to an improved method and system for rendering the execution of object-oriented programs visually on a computer.

BACKGROUND

There are three important concepts in object-oriented programming: encapsulation, inheritance, and polymorphism. Encapsulation refers to how implementation details are hidden by an abstraction called an "object." An object is said to encapsulate data and operations on that data. An object-oriented software system is made up of objects interacting with one another. They interact by sending "messages" to each other. An object implements its response to a message in a "method." Objects are unaware of each other's implementations; they only know the messages other objects respond to. Encapsulation controls complexity by partitioning the software system into small, well-defined pieces, and it makes it easy to change part of the system without affecting other parts.

Objects send messages as a result of receiving them. The "call stack" for an object-oriented program records the current chain of communication from object to object. After the first object on (the top of) the call stack sends a message to the second object, the first object waits for the method on the second object (which implements the message) to finish executing. After the second object on the call stack sends a message to the third object, the second object waits for completion of the corresponding method, etc. The last object on the (bottom of the) call stack is the one for which a method is being executed currently. The first object on the call stack is the "caller" of the second object on the call stack. The second object is the first's "callee." Similarly, the second object on the call stack is the caller of the third object, and the third is the callee of the second, and so forth.

Inheritance refers to taxonomic relationships between objects. An object belongs to and is defined by a "class." A class defines the set of messages an object can respond to, and it defines the data and methods that implement those responses. An object is said to be an "instance" of a class. A class can have arbitrarily many instances.

Inheritance lets classes be defined in terms of other classes. A class that inherits from another class is called a "subclass" of the other class (which is called the "parent class" or "superclass"). The subclass responds to the same messages as its parent, and it may respond to additional messages as well. The subclass "inherits" its implementation from its parent, though it may choose to reimplement some methods and/or add more data. Inheritance lets programmers define new classes easily as incremental refinements of existing ones. It also enables polymorphism.

Polymorphism refers to the substitutability of related objects. Objects are "related" if they have the same "type," and in most object-oriented languages that means they are instances of the same class, or they have a common parent class through inheritance. Objects that are related through inheritance may be treated uniformly, that is, without regard to their specific type. For example, a Graphic class that defines an abstraction for graphical objects may define a Draw method. The Graphic class might have subclasses Rectangle and Circle that reimplement the Draw method to draw a rectangle and circle, respectively. Polymorphism allows Rectangle and Circle instances to be treated uniformly as Graphic objects; that is, all one needs to know to tell an object to draw itself is that the object is an instance of a Graphic subclass. Whether the object is an instance of Rectangle or Circle is immaterial; one can send it the Draw message without knowing its exact type (e.g., Rectangle or Circle).

Polymorphism lets programmers write general code that can be customized later without change. Suppose we have code that draws pictures by sending Draw messages to a set of Graphic instances. We can pass it Rectangle and Circle objects, and it will tell them to draw themselves. Later we can define a new subclass of Graphic, say, Polygon, implementing its Draw method appropriately. Because Polygon is a subclass of Graphic, we can pass instances of Polygon to our picture-drawing code, and it will draw polygons in our picture—with no modification whatsoever.

Object-oriented programs often use thousands of objects, organized by tens or hundreds of classes. Often it's hard to understand how these programs work just by examining their code, since the code describes only the static aspects of the program (i.e., the classes). Understanding the dynamic aspects of the program requires a depiction of the program at execution time. Animated graphics are a way to depict an object-oriented program's execution.

U.S. Pat. No. 4,885,717 to Beck discloses a graphical presentation depicting individual objects on the display sending messages to each other. Objects appear as graphical nodes, and messages are shown as directed lines between the nodes. Once drawn, objects stay in fixed positions for the duration of the program's execution. No semantics are associated with placement of nodes.

Another well-known visual metaphor is the "interaction diagram," which also depicts messages to classes or objects over time. Typically, a message is shown as a labeled directed line that points to a perpendicular line denoting a class or object. Distance along the class or object line corresponds to time. Lines denoting messages are parallel to each other and are ordered to reflect the order in which the messages were sent Lines denoting classes or objects appear parallel to each other and perpendicular to the message lines. The advantage this metaphor has over Beck's approach is that repeated messages sent to the same or nearby objects do not interfere with each other, since time is given a physical dimension.

STATEMENT OF PROBLEMS WITH THE PRIOR ART

There are two main problems with the prior art:
1. It does not handle realistic quantities of objects. Non-trivial object-oriented systems employ hundreds of objects or more. In Beck's approach, displaying each object in the system produces an unintelligible mass of graphics. Moreover, objects never disappear, even when they have been deleted. Deleted objects further clutter the presentation. They distract the observer, making it harder to see the objects that are active. Displaying deleted objects may also mislead the observer into thinking that there are more objects in the system than there really are. Interaction diagrams have analogous problems: as the number of objects or classes increases, one dimension of the diagram must increase with it. This quickly yields diagrams that are too large to be effective.

2. It does not handle realistic quantities of messages. Each time a message is sent, another directed line appears to depict it. Hence the number of directed lines corresponds to the number of message sends. Since this number generally exceeds the number of objects in the system, the display becomes cluttered with directed lines even more quickly than it does with objects. In Beck's approach, these lines compete for space that is determined by the number of objects. The resulting interference among the lines makes the diagram unintelligible. In interaction diagrams, the problem manifests itself as unmanageably long diagrams along the time dimension.

As a result of these problems, the prior art is not effective for systems that are large enough to need dynamic graphical presentation. The need exists for a visual metaphor that reveals both microscopic and macroscopic behavior in an object-oriented program regardless of its size and complexity. The present invention addresses such a need.

SUMMARY

In accordance with the aforementioned needs, the present invention is directed to an improved method and system for visualizing an object-oriented program's execution in a manner that facilitates understanding, debugging, and tuning programs of arbitrary size and complexity.

According to the present invention, a computer system for visualizing information about the execution of one or more object-oriented programs, includes: a central processing unit executing the one or more object-oriented programs, each program having one or more objects, each object being an instance of a class, and the one or more of the objects communicating by sending messages; an event collector that collects one or more events to create an event stream representing the messages communicated between the objects; and a visualization mechanism for extracting from the event stream a sequence of one or more messages to an object or between objects and for depicting the sequence visually as a tree wherein each node represents one object and each edge represents a message between the objects.

To manage the complexity of what is displayed, the present invention also has features which allow subtrees to be collapsed so that they appear in abbreviated form and to expand collapsed subtrees so that they are visible in full. This feature advantageously enables a user to focus on those parts of the execution that are immediately relevant. According to a second aspect of the present invention, the computer system includes means for depicting an expanded tree, or zero or more expanded subtrees thereof, in an abbreviated form which represents a collapsed node, including the one or more messages sent by the collapsed node and one or more callee nodes associated with the one or more messages sent.

According to a second aspect of the present invention, the computer system includes means for specifying which nodes are collapsed or expanded.

According to a third aspect of the present invention, the means for specifying includes a graphical means for toggling the node between the collapsed and expanded state by graphically selecting the node.

According to a fourth aspect of the present invention, the means for specifying includes a textual means for toggling the node between the collapsed and expanded state by textually specifying one of a message identifier and object identifier.

According to a fifth aspect of the present invention, a root of the tree can be extended by showing the one or more messages and objects that produced the tree.

According to a sixth aspect of the present invention, the computer system includes an execution pattern analyzer for classifying one or more execution patterns in the event stream as equivalent message sequences. This feature of the present invention allows equivalent subtrees to be consolidated automatically, replacing them with a more general subtree, called an "execution pattern," that subsumes them all.

According to a seventh aspect of the present invention, the execution pattern analyzer classifies as equivalent message sequences those that invoke identical methods on identical objects in identical order.

According to an eighth aspect of the present invention, the execution pattern analyzer classifies as equivalent message sequences those that invoke identical methods in identical order.

According to a ninth aspect of the present invention, the execution pattern analyzer classifies as equivalent message sequences those that represent identical messages sent to objects having related classes in identical order.

According to a tenth aspect of the present invention, the execution pattern analyzer classifies as equivalent message sequences those that represent identical messages sent to related classes of objects in identical order.

According to an eleventh aspect of the present invention, the execution pattern analyzer is adapted for considering a percentage X of the execution pattern when classifying the equivalent message sequences.

According to a twelfth aspect of the present invention, the execution pattern analyzer is adapted for disregarding order in the execution pattern when classifying the equivalent message sequences.

According to a thirteenth aspect of the present invention, the execution pattern analyzer is adapted for disregarding frequency of repetition in the execution pattern when classifying the equivalent message sequences.

According to a fourteenth aspect of the present invention, the visualization mechanism is adapted for depicting an execution pattern reflecting iteration in the program in an abbreviated form.

According to a fifteenth aspect of the present invention, the visualization mechanism is adapted for depicting an execution pattern reflecting recursion in the program in an abbreviated form.

Furthermore, the present invention has features for augmenting an execution pattern with summary (such as performance or complexity) information. This summary information reflects characteristics of the message sequences, for example, the resource usage they incur, or a measure of their complexity. The summary information is preferably superimposed graphically on the execution pattern's graphical rendition.

BRIEF DESCRIPTION OF THE DRAWINGS

These and other features, aspects, and advantages of the present invention will become better understood with reference to the following description, appended claims, and accompanying drawings wherein:

FIG. 1b depicts a prior-art data structure representing an event generated by an object-oriented program executing on the computer system shown in FIG. 1a;

DETAILED DESCRIPTION

Figure 1A:
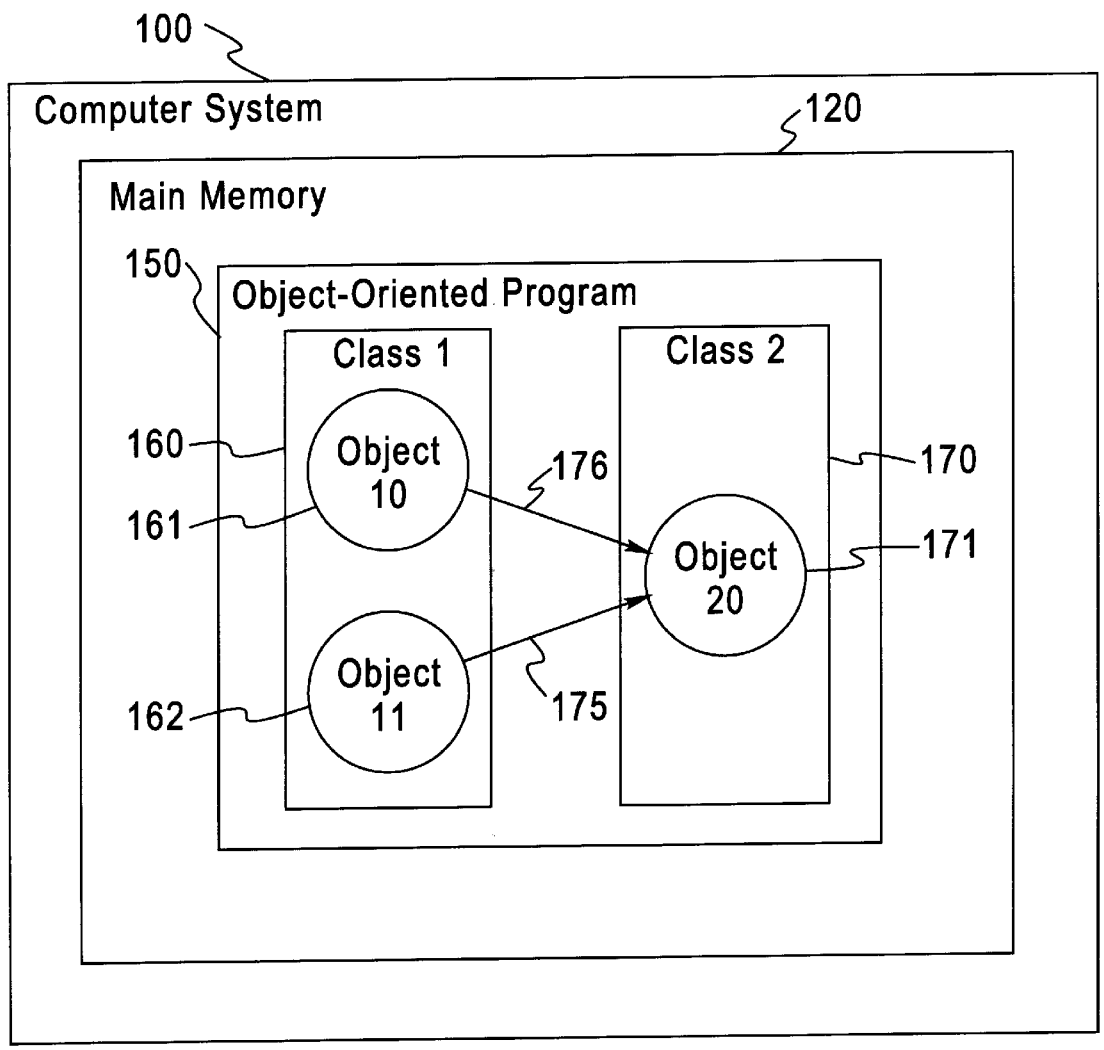
FIG. 1a is a block diagram of a prior-art computer system executing an object-oriented program.

FIG. 1a is a block diagram of a prior art general-purpose Computer System (100) with Main Memory (120). An Object-Oriented Program (150) is loaded into Main Memory (120). The Object-Oriented Program (150) can be any object-oriented program known in the art. The Computer System (100) can be an IBM RS/6000 or any other general-purpose computer known in the art. (RS/6000 is a trademark of the IBM Corporation.)

One or more classes are defined by the Object-Oriented Program (150). Two such classes are depicted as Class1 (160) and Class2 (170).

One or more objects are created when the Object-Oriented Program (150) is executed in the Computer System (100). These objects are instances of their respective class(es). FIG. 1a shows two such objects of Class1 (160) and one object of Class2 (170). The objects of Class1 are Object10 (161) and Object11 (162). The object of Class2 (170) is Object20 (171).

Objects communicate by sending messages, as shown by the arrow Message (175). Objects can also create other objects, as shown by the arrow Creation (176).

Figure 1B:
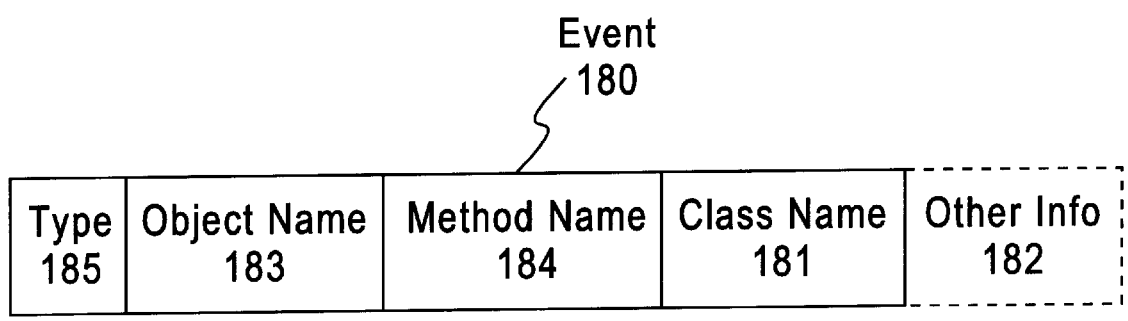

FIG. 1b shows the structure of an Event (180) generated by an Object-Oriented Program (150). An Event (180) is a small data structure with information about the running Object-Oriented Program (150). As depicted, an Event (180) preferably contains the following information:

- Type (185), one of "Enter" or "Leave";
- Method Name (184), the name of the method that is being entered or left;
- Object Name (183), the name of the object that received the Message (175); and
- Class Name (181), the name of the class to which the object belongs.

An event may contain other information (182).

Two Events (180) are produced for every Message (175) sent in the Object-Oriented Program (150). An Event (180) of Type (185) "Enter" is produced at the start of Message (175) processing; another Event (180) of Type (185) "Leave" is produced at the end of Message (175) processing.

Figure 1C:
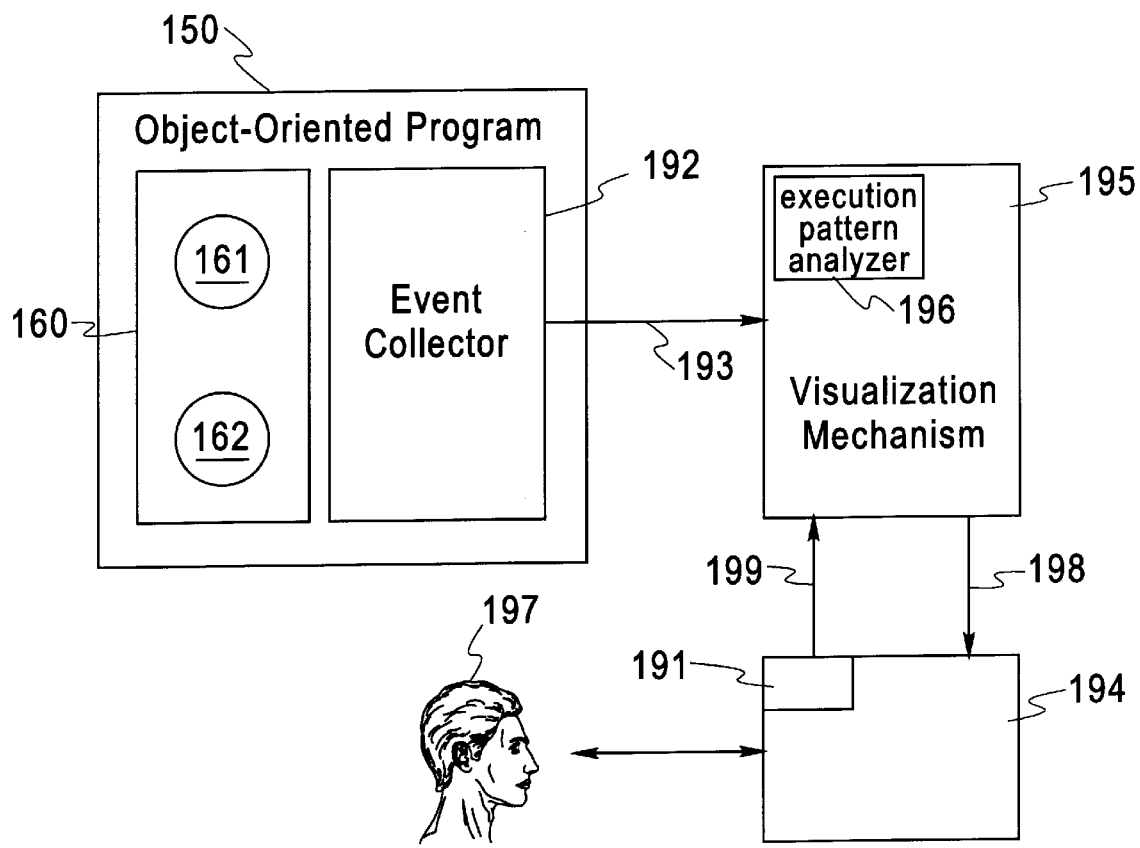
FIG. 1c is a block diagram of an executing object-oriented program augmented with a visualization mechanism and execution pattern analyzer having features of the present invention.

The present invention is generally directed to an improved method and system for visualizing an object-oriented program's execution in a manner that facilitates understanding, debugging, and tuning of object-oriented programs of arbitrary size and complexity. FIG. 1c shows the Object-Oriented Program (150) augmented with an Event Collector (192) and Visualization Mechanism (195) according to the present invention. Events (180) are collected by Event Collector (192), which generates an Event Stream (193), which is processed by the Visualization Mechanism (195). The Visualization Mechanism (195) (described with reference to FIG. 2b) outputs (198) a view of the execution of the Object-Oriented Program (150) to a User (197) on a conventional output device such as a Graphical Display (194). The User (197) may also interact with the view via a conventional input device (191) such as keyboard or mouse to expand, elide, and or extract additional execution information. The Visualization Mechanism (195) preferably includes an Execution Pattern Analyzer (196) (described with reference to FIG. 5) that processes information such as the automatic classification of message sequences as "equivalent" execution patterns.

As will be discussed with reference to FIGS. 12–15, The Execution Pattern Analyzer (196) enables further reductions in the complexity of information presented, such as allowing the depiction of iterative and recursive patterns in an abbreviated form.

The Visualization Mechanism (195) may execute concurrently with the Object-Oriented Program (150), or it may execute at a later time by processing a stored version of the event stream. In a preferred embodiment, the Visualization Mechanism (195) resides in Main Memory (120) of the Computer System (100). Those skilled in the art will appreciate, however, that the Visualization Mechanism (195) need not execute on the same computer system as the Object-Oriented Program (150).

Figure 2A:
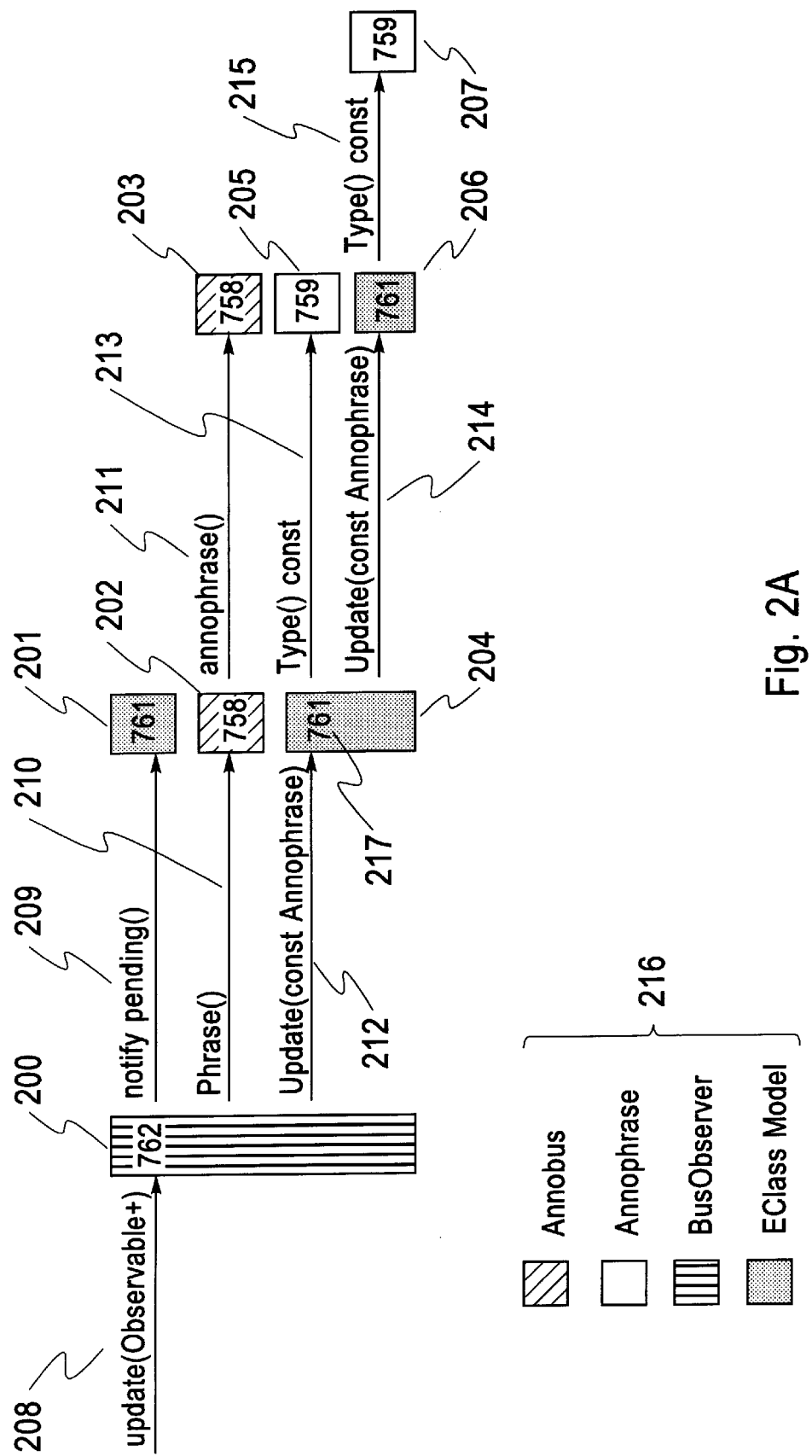
FIG. 2a shows an example of an output of the visualization mechanism depicting a sequence of messages from a program's execution as a tree data structure.

FIG. 2a shows an example of an output of the visualization mechanism depicting a sequence of messages from a program's execution as a tree structure. As depicted, objects (corresponding to nodes in the tree) may be drawn as colored squares or rectangles (200–207), and messages (corresponding to edges of the tree) may be shown as labeled arrows (208–215). Objects are preferably labeled with an object identifier (ID) (217). The respective object classes may also be differentiated by color as indicated in the class legend (216). The labels on the arrows identify the names of the messages.

The message sequence shown in FIG. 2a begins with an initial message "update" (208) being sent to an object (200) with ID 762 of class BusObserver. The object (200) in turn sends a message "notify" (209) to the object (201) with ID 761 of class EClassModel. Object 762 then sends (210) a message "Phrase" (210) to the Annobus object (202) with ID 758. In response, the Annobus object (202) sends a message "annophrase" (211) to itself (203). The sequence continues with object 762 (200) calling object 761 (204); object 761 (204) calling object 759 (205); object 761 (204) calling itself (207); and finally object 761 (206) calling object 759 (207).

Figure 2B:
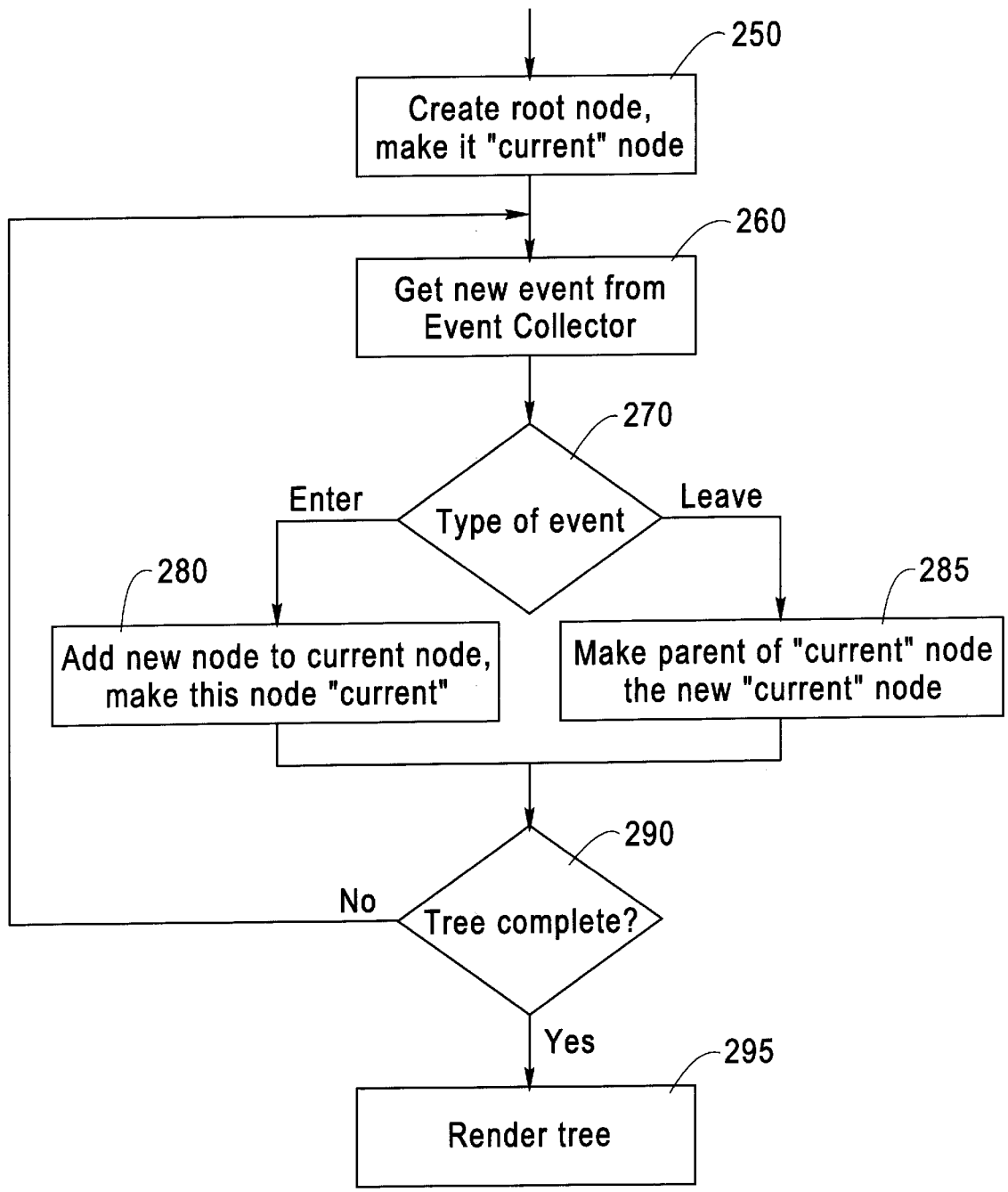
FIG. 2b depicts a logic flow chart of the visualization mechanism for depicting a sequence of messages from a program's execution as a tree data structure.

FIG. 2b depicts a logic flow chart of a visualization mechanism (195) having features of the present invention for depicting a sequence of messages from a program's execution as a tree data structure. Preferably, the visualization mechanism (195) is embodied as a computer program, tangibly embodied in a computer-readable medium such as a magnetic disk or optical memory such as CD-ROM executable by computer system (100) to accomplish the method steps depicted in FIG. 2b. As noted, the Visualization Mechanism (195) typically resides in Main Memory (120) of the Computer System (100) with the object-oriented program (150). However, as also noted, the Visualization Mechanism (195) need not execute on the same computer system as the Object-Oriented Program (150). As depicted in FIG. 2b, in step 250, a root node is created and is declared as the "current" node. In the loop formed by steps 260–270–280–290, Events (180) from the Event Collector (192) are processed one by one. In step 260, a new Event (180) is communicated by the Event Collector to the visualization mechanism (195). In step 270, the visualization mechanism (195) determines the Type (185) associated with the Event. In step 280, for an event (180) of Type (185) "Enter," a child node of the current node is created in the tree. This new node is declared to be the new "current" node. In step 285, for an event (180) of Type (185) "Leave," the parent of the current node is declared to be the new "current" node. In step 290, if the tree is not complete, event processing continues at step 260 and iterates as described for new events arriving via the event stream (193). In step 295, if the tree is complete, the tree is rendered on a conventional output device such as a display (194). The rendering (step 295) may be accomplished by conventional graphics and layout techniques well known to one of skill in the art. See for example, "Fundamental of Interactive Computer Graphics," by Foley, Van Dam, and Andries, 1982, Addison-Wesley.

Figure 3:
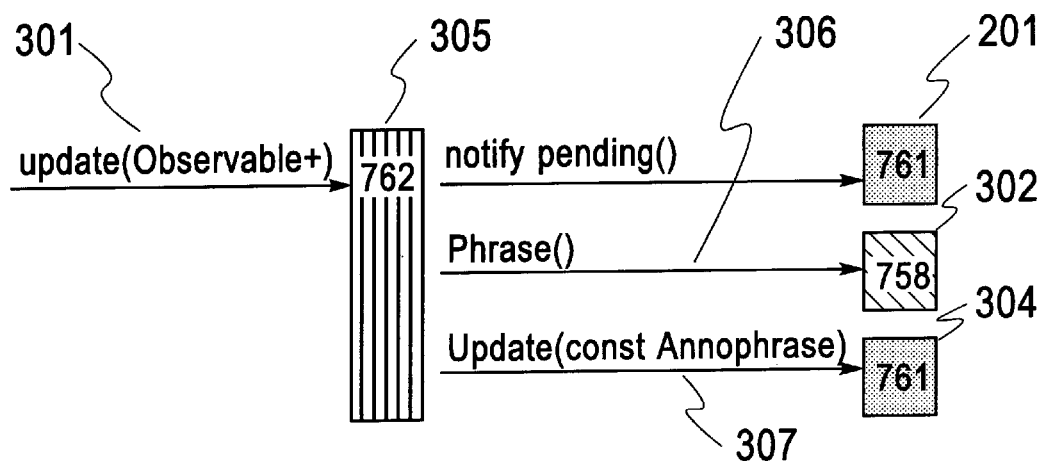
FIG. 3 shows the sequence of messages depicted in FIG. 2a with some of the sub-trees in an abbreviated form.

FIG. 3 depicts the same sequence of messages as FIG. 2a, but some of the subtrees appear in abbreviated form. In a preferred embodiment, abbreviated object ID 758 (302) and abbreviated object ID 761 (304) have beveled borders, making them look raised as opposed to flat. Here, a beveled border rectangle indicates that the object reacted to the stimulus (e.g., 306 or 307) by sending one or more messages. Preferably, the user can specify the part(s) of the tree to be abbreviated by graphically selecting an object's graphical representation. Using an input device (191) such as a mouse and clicking on a raised object reveals the message(s) that the object sent along with the object(s) that received the message(s). After clicking on subsequent raised objects, we return to a view like the one in FIG. 2a. All objects in this figure now appear flat, meaning that there are no more hidden messages. If less detail is desired, part of the view can be collapsed by clicking on flat objects, thereby hiding their respective responses (and making them appear raised).

These features of the present invention enabling the expansion and collapse of subtrees enhance current navigation techniques. The user can selectively drill down to any level of detail without being flooded with information. Further, this feature reinforces the concept of encapsulation in object-oriented programs: details of how an object performs a given task are hidden until one asks for them explicitly.

Graphical selection is one way to specify the parts of the tree that should be abbreviated. Another approach is to specify the names of messages or object identifiers textually. For example, the user may change the rendering shown in FIG. 2a to that of FIG. 3 by typing the ID of the objects to collapse, e.g. "758" and "761."

Figure 4:
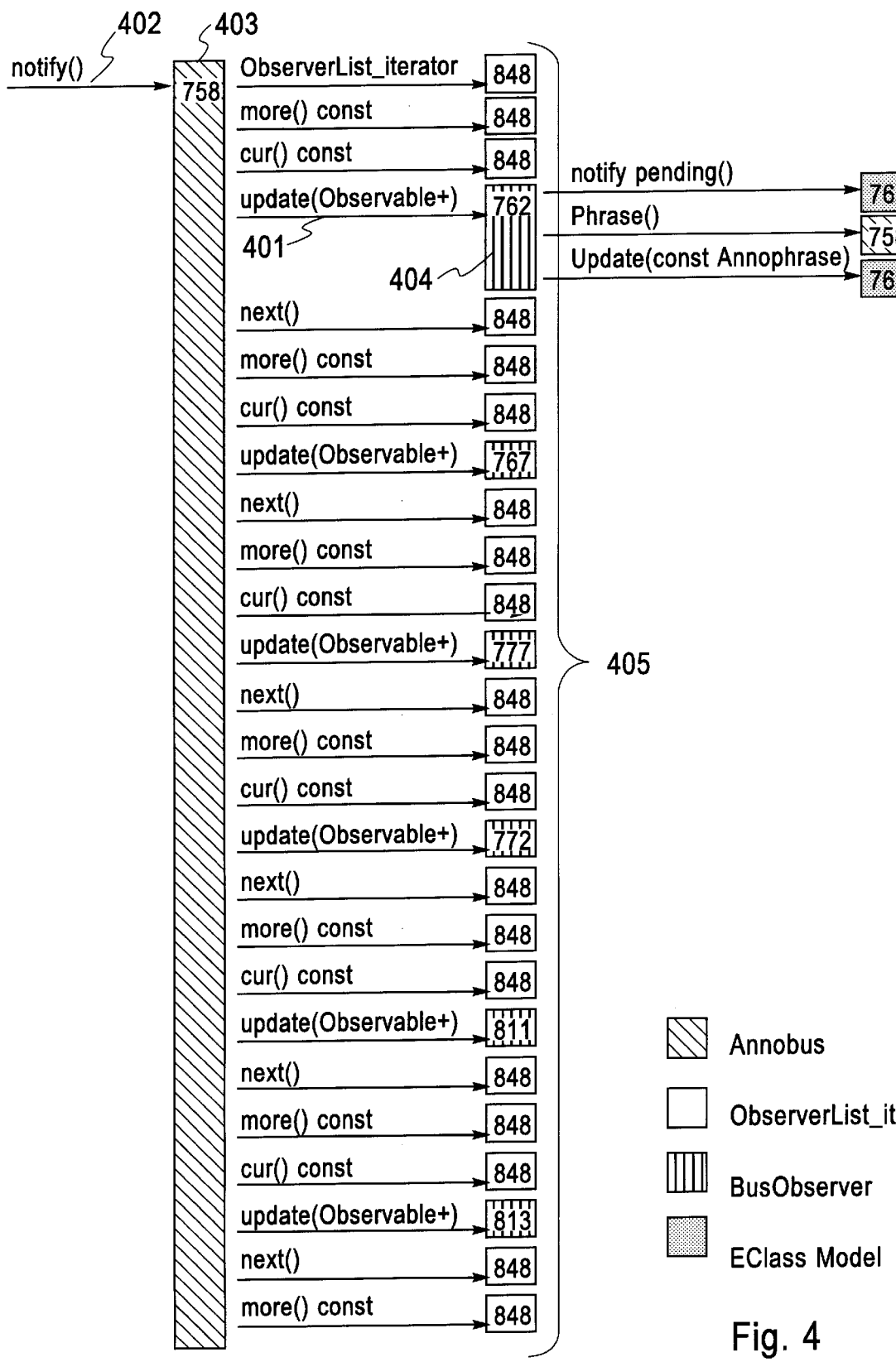
FIG. 4 shows an example of the visualization mechanism for depicting an extended view of the origin of the sequence of messages of FIG. 3.

When presented with a view like the one in FIG. 3, a user is likely to ask questions such as, "Who sent the initial message 'update' to the BusObserver object (ID: 762)?", and "What messages gave rise to that initial message?" Another aspect of the present invention provides a visual answer to questions such as these. FIG. 4 shows an example output of the visualization mechanism (195) for depicting an extended view of the origin of the sequence of messages of FIG. 3. The visualization mechanism allows the user to navigate up the tree one level to view the sender of the update message (301). The resulting extended view is shown in FIG. 4. It shows the object (403) that sent the message "update" (401; 301 in FIG. 3) to object 762 (404; 305 in FIG. 3). It also shows the message (402) that produced the message (401) sent to object 762 (404), together with the other messages (405) it produced.

As a program executes, it usually produces many similar if not identical message sequences. Detecting and visualizing these repetitions can make understanding the program a lot easier for the user, because he can identify and think in terms of a relatively few repeated patterns of behavior.

Figure 5:
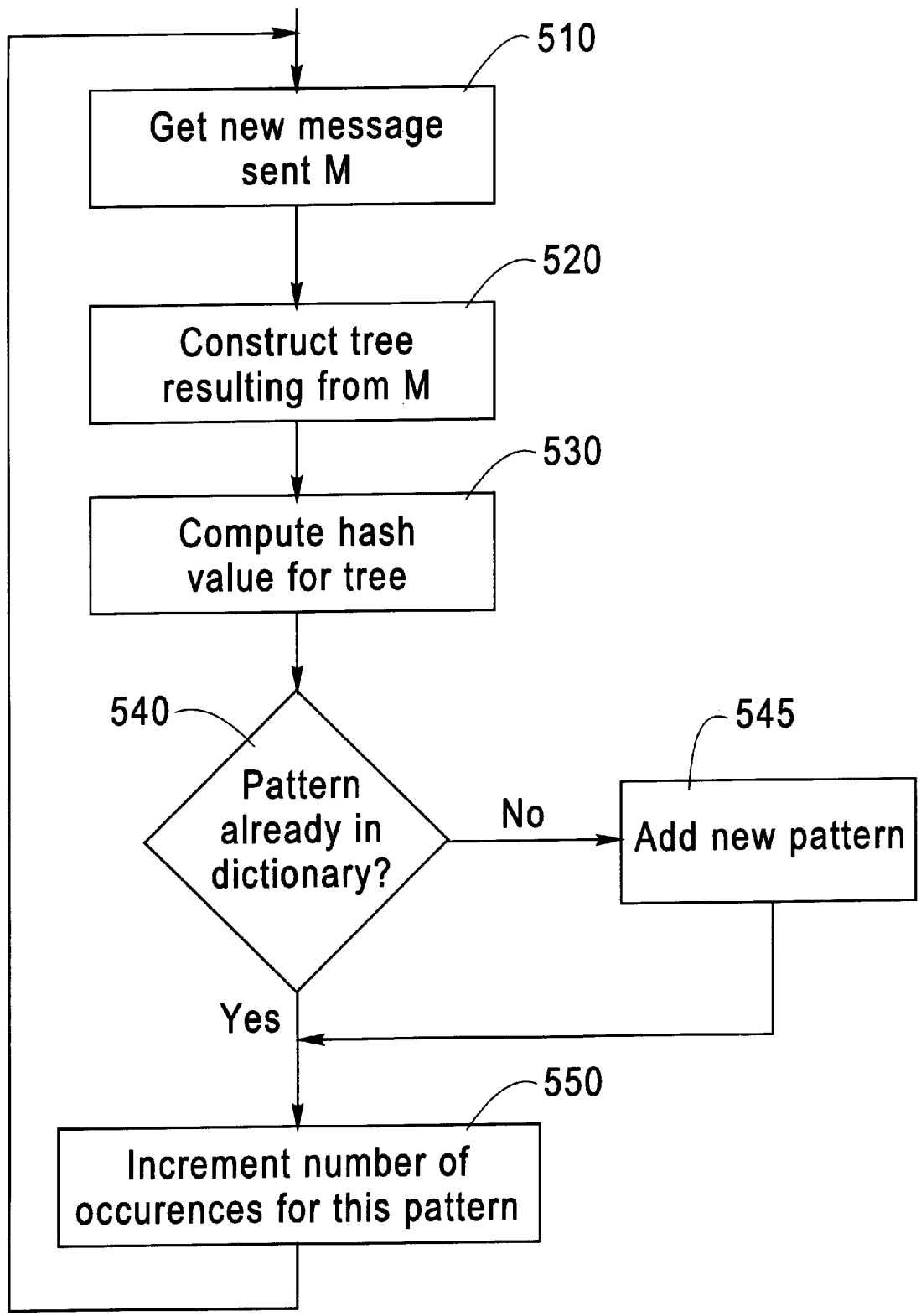
FIG. 5 depicts a logic flow chart of the execution pattern analyzer of FIG. 1c for recognizing equivalent message sequences in the event stream.

FIG. 5 depicts an example of a logic flow chart of an execution pattern analyzer (196) having features of the present invention for recognizing equivalent message sequences in the event stream. Preferably, the execution pattern analyzer (196) is embodied as a computer program, tangibly embodied in a computer-readable medium such as a magnetic disk or optical memory such as CD-ROM executable by computer system 100 to accomplish the method steps depicted in FIG. 5. As depicted, in step 510, for every message (M), we construct, in step 520, a tree that corresponds to the messages resulting from M. In step 530, a hash value is computed for the tree. In step 540, the hash value is used to compare the tree against existing entries (also called "execution patterns" or "patterns") in a dictionary. The use of hash tables and computation of hash values is well known in the art See, e.g., D. E. Knuth, "Sorting and Searching," pp. 546–549, Addison-Wesley (1973). In step 545, if no pattern in the dictionary corresponds to the tree, a new pattern is added to the dictionary. In step 550, if the pattern is found in the dictionary, then increment a counter which tracks the number of occurrences for this pattern. A pattern in the dictionary with a high frequency corresponds to sequences of messages that occur often.

In a preferred embodiment, there are varying degrees of equivalence of trees, and they are user-selectable. A simple definition of equivalence considers two trees in a program execution identical if their topologies are identical and if there is a perfect match for every object and every message in both trees.

Figure 6:
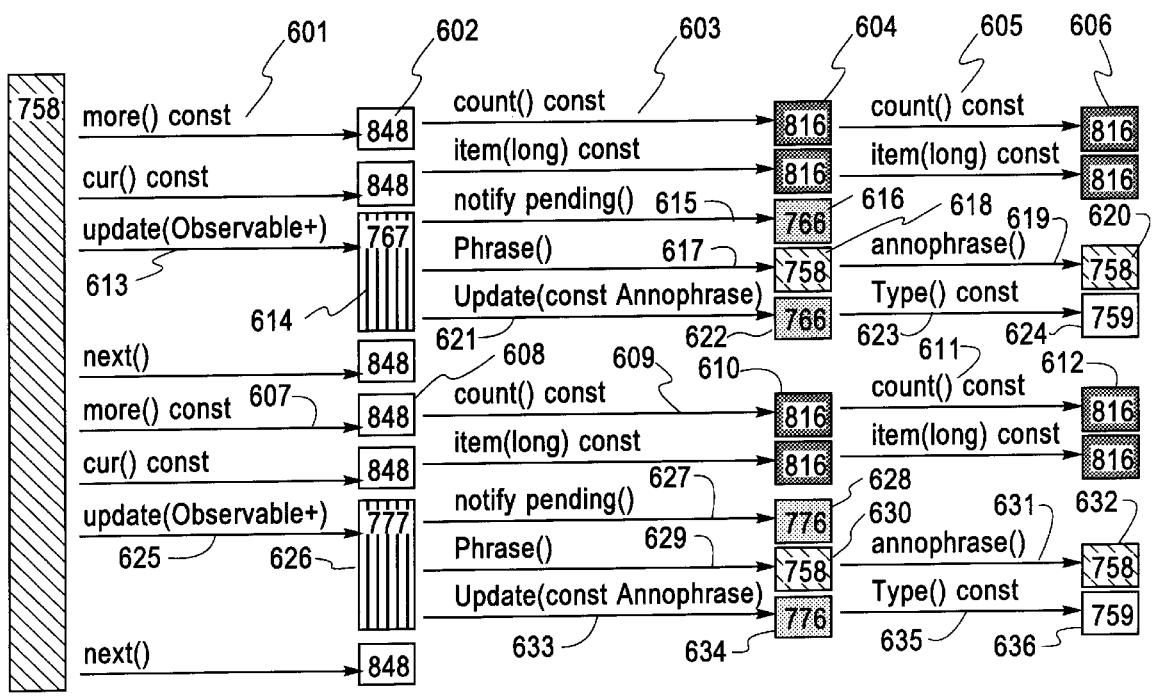
FIG. 6 illustrates an example of an equivalent message sequence wherein equivalence means a same-ordered sequence of the same messages to identical classes of objects.

In FIG. 6, the sequence depicted by items 601–606 and the sequence depicted by items 607–612 match perfectly. The computation that produces the unique hash value for each subtree takes into account the names of the messages and the IDs of the objects. Thus the hash values computed for sequence 601–606 and sequence 607–612 in FIG. 6 will be the same, and these sequences represent the same pattern.

Matching sequences that have identical messages and objects is easy, but it is too strict for most programs; few trees would ever be combined under this definition.

Often, the same message pattern involves different objects. If the same sequence of messages gets sent to different instances of the same classes, the user will deem these sequences identical behavior. Hence, messages sent to different objects can be part of the same pattern if both the rest of the pattern is the same and the receiving objects are instances of the same class.

FIG. 6 illustrates an example of an equivalent message sequence wherein equivalence means a same-ordered sequence of the same messages to identical classes of objects. As depicted, the sequences 613–624 and 625–636 have identical messages. However, the objects involved in these two sequences are not always identical. For example, object ID 767 (614) and object 777 (626) are different even though they belong to the same class. If the user defines equivalence of sequences to mean the same messages to the same classes of objects, then a unique hash value for every sequence will be computed from the name of each message and the class of each object.

Figure 7:
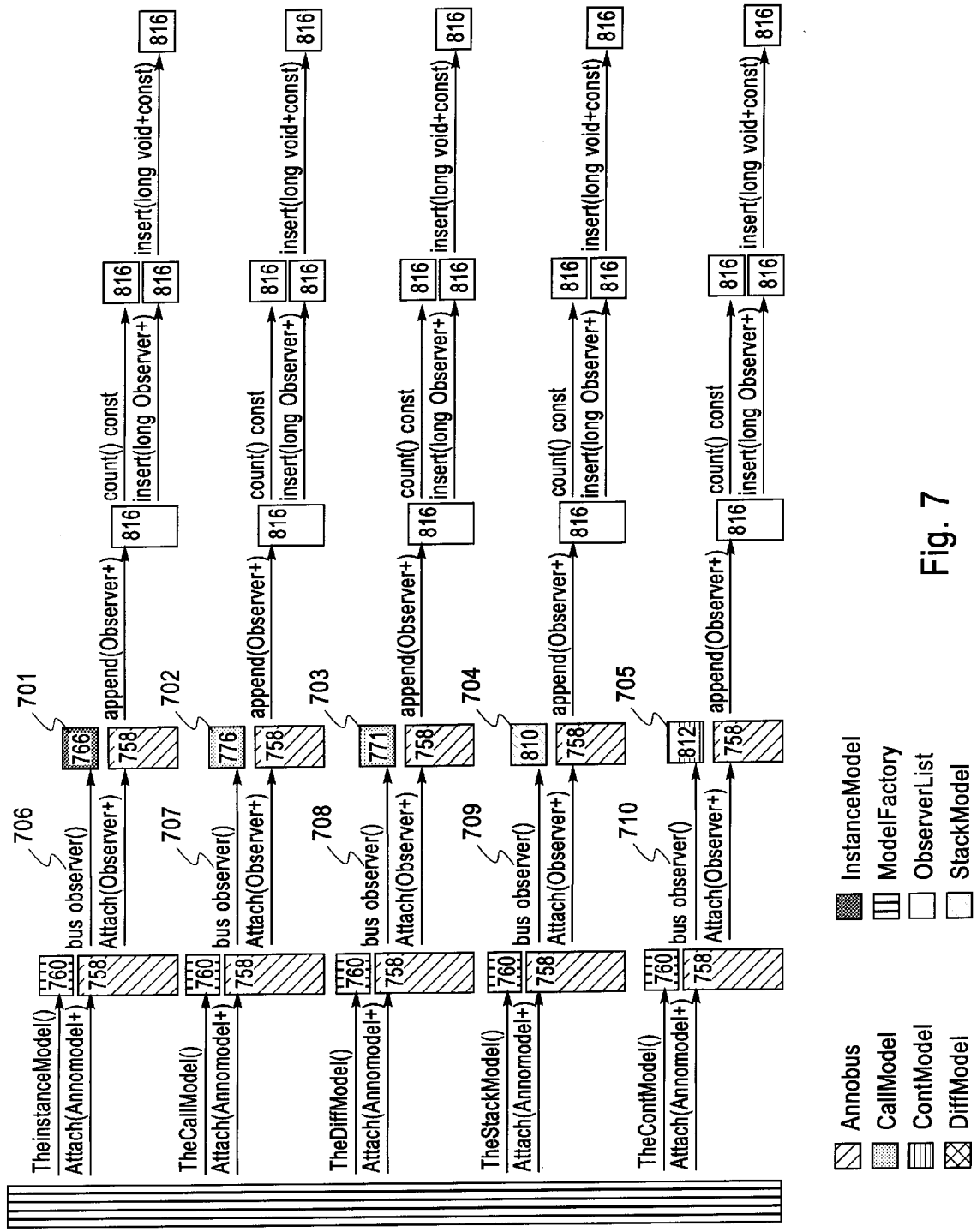
FIG. 7 illustrates an example of an equivalent message sequence wherein equivalence means a same-ordered sequence of the same messages to the related classes of objects.

FIG. 7 illustrates an example of an equivalent message sequence wherein equivalence means a same-ordered sequence of the same messages to the related classes of objects. Here, several nearly identical sequences, except for objects having IDs 766, 776, 771, 810, and 812 (701–705), are shown. These objects belong to classes that are related; that is, they are instances of classes in the same class hierarchy. The message "bus_observer" (706–710), sent to each of these objects (701–705), is polymorphic. Therefore a user might want to consider the sequences containing these objects (701–705) to be equivalent.

Figure 8:
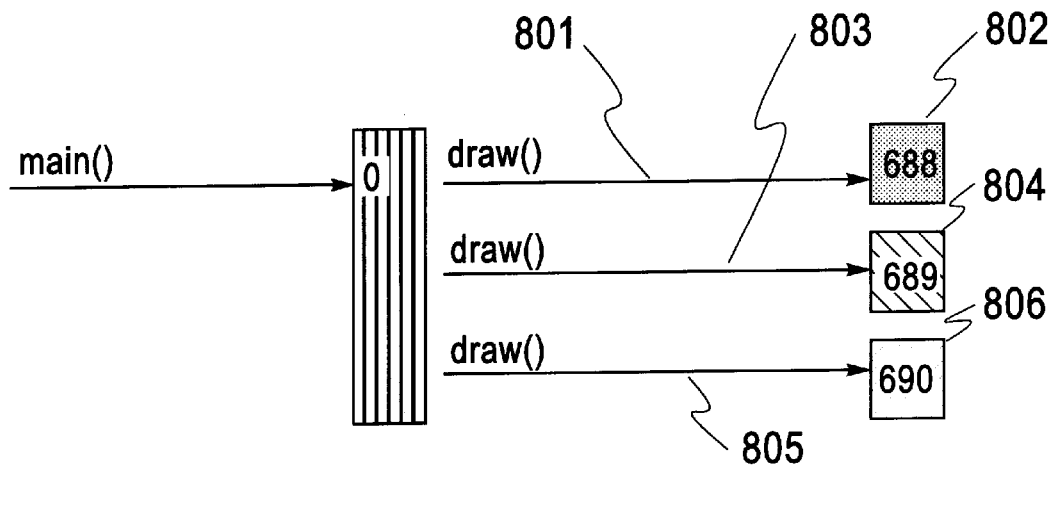
FIG. 8 illustrates an example of an equivalent message sequence wherein equivalence means a same-ordered sequence of the same messages.

FIG. 8 illustrates an example of an equivalent message sequence wherein equivalence means a same-ordered sequence of the same messages. In other words, a user can increase the matching tolerance (that is, relax the matching criteria to increase the total matches) by ignoring the classes of the objects in sequences and comparing only messages. For example, FIG. 8 shows three sequences, (801–802), (803–804), and (805–806), that have identical messages ("draw") but involve objects from different classes. If messages alone were considered during the matching, there would be three equivalent sequences in this case.

Figure 9:
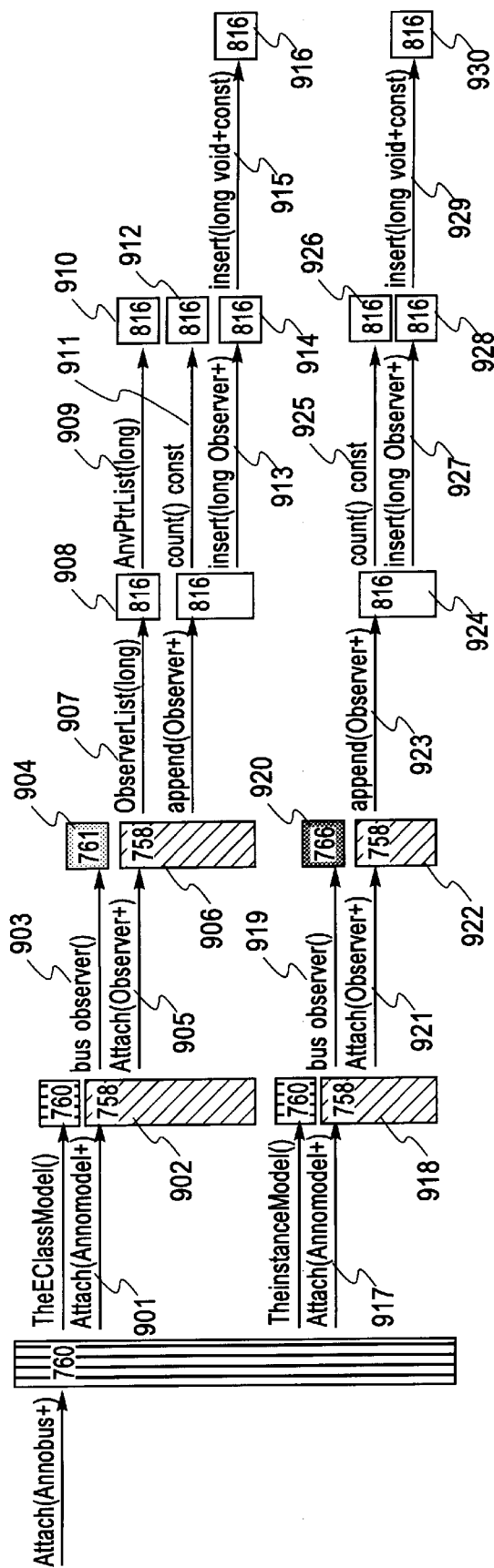
FIG. 9 illustrates an example of an equivalent message sequence wherein equivalence is determined for a specified percentage of the sequence.

FIG. 9 illustrates an example of an equivalent message sequence wherein equivalence is determined for a specified percentage of the sequence. In some cases, two large sequences might be equivalent (based on any of the criteria mentioned thus far) except for one relatively small subsequence. FIG. 9 shows an example of two sequences (901–916) and (917–930) that are the same except for a small subsequence, namely (907–910). The user may want to lump such sequences into the same pattern by specifying a percentage X of the sequences that must match (for the given matching criterion).

Figure 10:
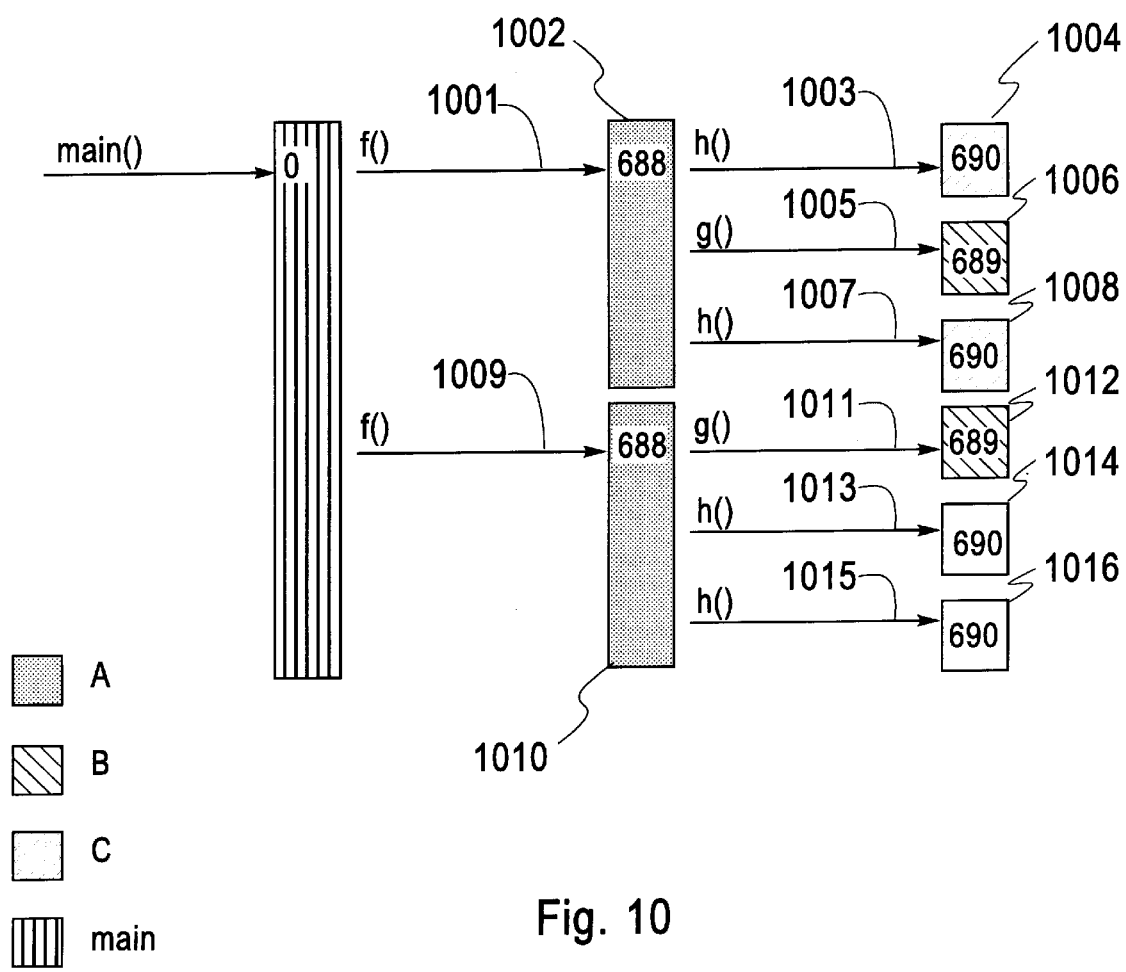
FIG. 10 illustrates an example of an equivalent message sequence wherein equivalence means the same messages regardless of order.

FIG. 10 illustrates an example of an equivalent message sequence wherein equivalence means the same messages regardless of order. Two of the sequences (1001–1008 and 1009–1016) depicted are identical except that the order of messages is slightly different. Here, a user may decide to consider these to be equivalent sequences.

Figure 11:
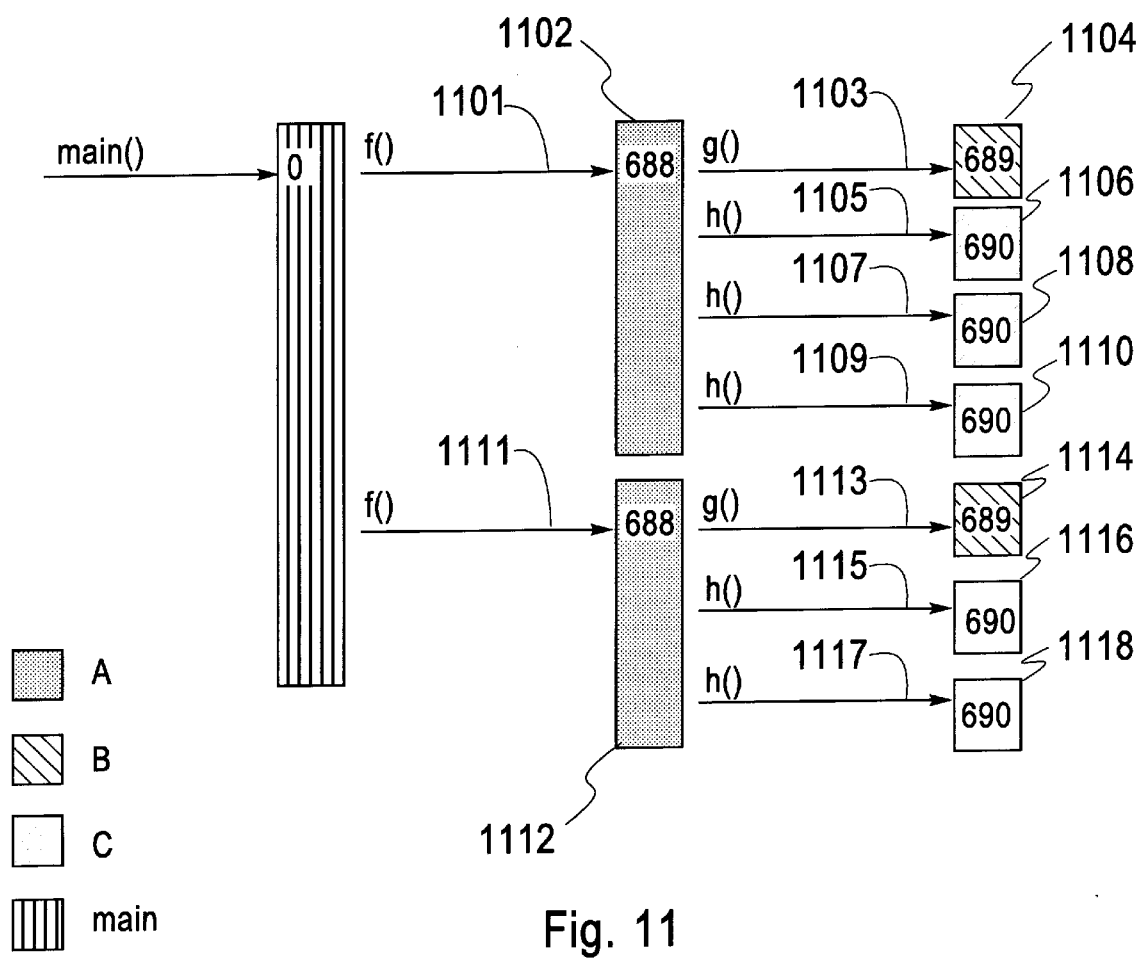
FIG. 11 illustrates an example of an equivalent message sequence wherein equivalence means a same-ordered sequence of the same messages to identical classes of objects, regardless of frequency of repetition.

FIG. 11 illustrates an example of an equivalent message sequence wherein equivalence means a same-ordered sequence of the same messages to identical classes of objects, regardless of frequency of repetition. Two of the sequences (1101–1110 and 1111–1118) depicted are the same except for the frequency of repetition of the "h" message (1105, 1107, 1109, 1115, 1117) to the C object (ID 690) (1106, 1108, 1110, 1116, 1118). In a preferred embodiment, the system may ignore this frequency and may classify such sequences under the same pattern.

Now that the programmer has several options to automatically classify equivalent sequences into patterns, these features of the present invention can be used to advantageously reduce the complexity of information presented. One application is to depict iteration in abbreviated (also called condensed) form.

Figure 12:
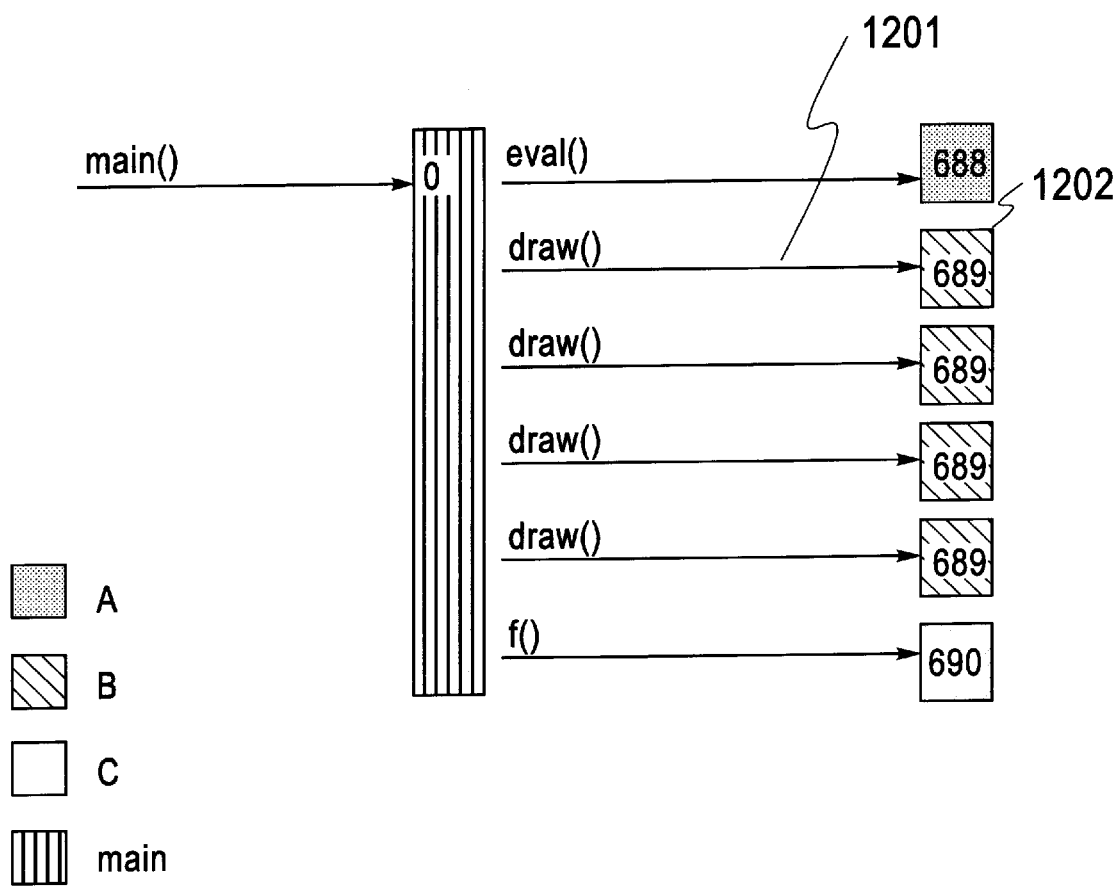
FIG. 12 shows an example of the visualization mechanism for depicting a repeated message in an uncondensed form.

FIG. 12 shows an example of the visualization mechanism for depicting a repeated message in an uncondensed form. Here, the "draw" message (1201) is sent four times to the object having ID 689 (1202). While this example has a repetition factor of only four, repetition factors are typically much higher. Uncondensed visualizations of such sequences rarely pull their own weight: they consume a lot of screen space without adding much information.

Figure 13:
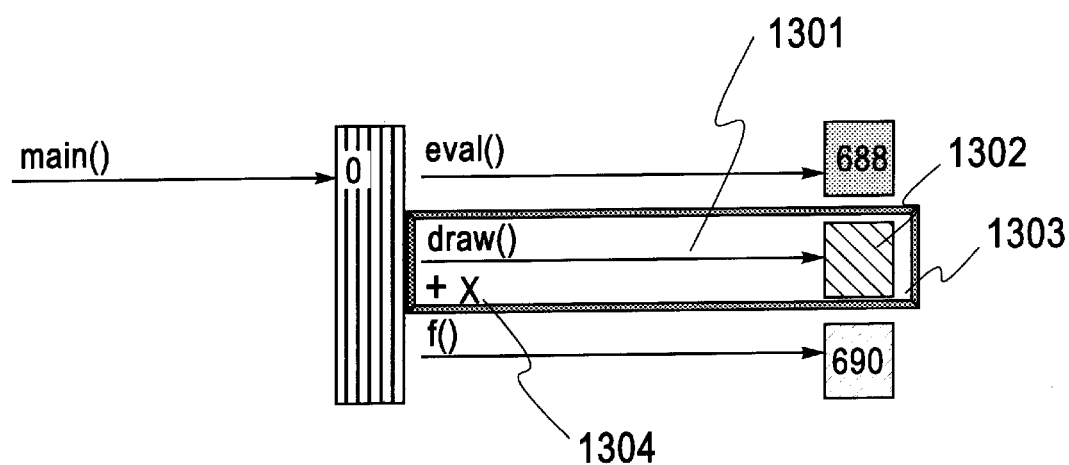
FIG. 13 shows an example of the repeated message of FIG. 12 visualized in an uncondensed form.
Figure 13:
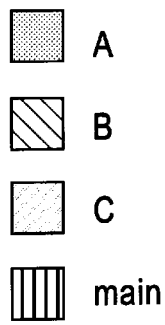

FIG. 13 shows an example of the repeated messages of FIG. 12 visualized in an abbreviated form by grouping equivalent sequence repetitions as part of the same pattern and displaying them in condensed form. The sequence (1301–1302) that was repeated four times now appears raised (1303), indicating the repetition factor (1304) in its lower left corner. This compact representation corresponds to a loop, i.e., iteration in the source code. Nested loops may be detected and depicted is a similar manner. Instead of the beveled frame (1303), other visual abbreviations may be used to indicate a pattern.

Figure 14:
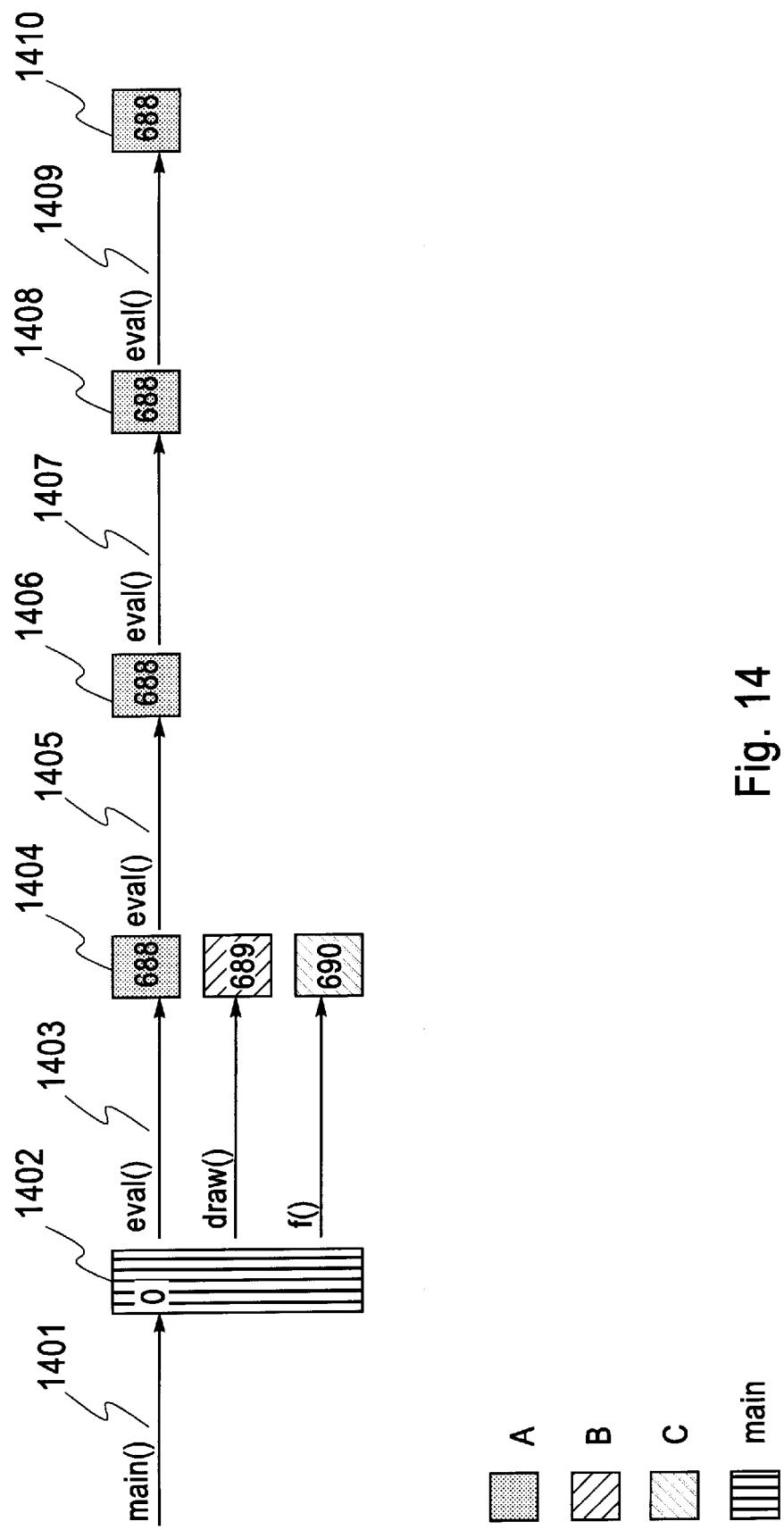
FIG. 14 shows an example of the visualization mechanism for depicting a recursive message sequence in an uncondensed form.

Another important kind of repetition is a recursive sequence. Recursion refers to the ability of a routine to call itself. Thus, while iteration manifests itself as a repetition of messages along the vertical axis in the view, recursion shows up as a repetition in the horizontal axis. FIG. 14 shows an example of the visualization mechanism for depicting a recursive message sequence (1403–1410) in an uncondensed form.

Figure 15:
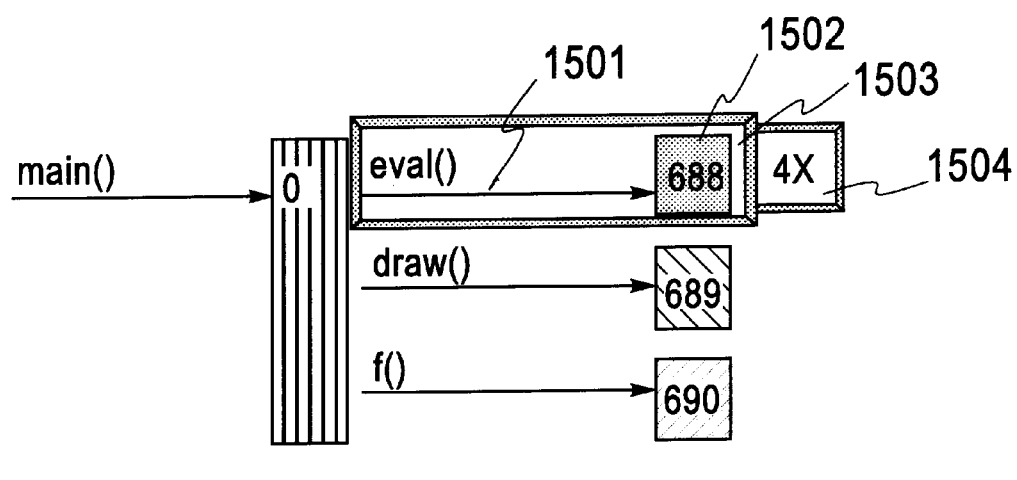
FIG. 15 shows an example of the recursive message sequence of FIG. 14 visualized in an uncondensed form.
Figure 15:
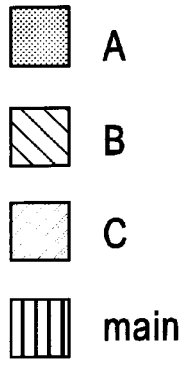

FIG. 15 shows an example of the recursive message sequence of FIG. 14 visualized in an abbreviated form with the repeated sequence (1501–1502) beveled (1503) and the repetition factor (1504) appearing on the right.

Now that the invention has been described by way of a preferred embodiment, various modifications within the spirit and scope of the present invention will occur to those skilled in the art. Thus, the preferred embodiment should not be construed to limit the scope of the invention which is properly defined by the appended claims.

For example, although the preferred embodiment has been applied to visualize object-oriented program execution in a concise way, the automatic classification of sequences into patterns can also help in performance tuning. Traditional optimization tools usually collect resource usage statistics (such as CPU time) on a per-method or per-procedure basis. This provides only a microscopic view of system performance, which is rarely a sufficient basis from which to re-architect the system for performance. Not only is it important to know which method takes a long time, but also the context in which it took a long time. Execution patterns can offer more contextual insight to aid performance tuning. An example of a system and method for generating an execution model and dictionary for collecting and storing performance data can be found in co-pending and previously incorporated by reference U.S. patent application Ser. No. 08/431,226, filed Apr. 28, 1995, entitled Storing and Querying Execution Information for Object-Oriented Programs, by W. De Pauw et al.

Figure 16:
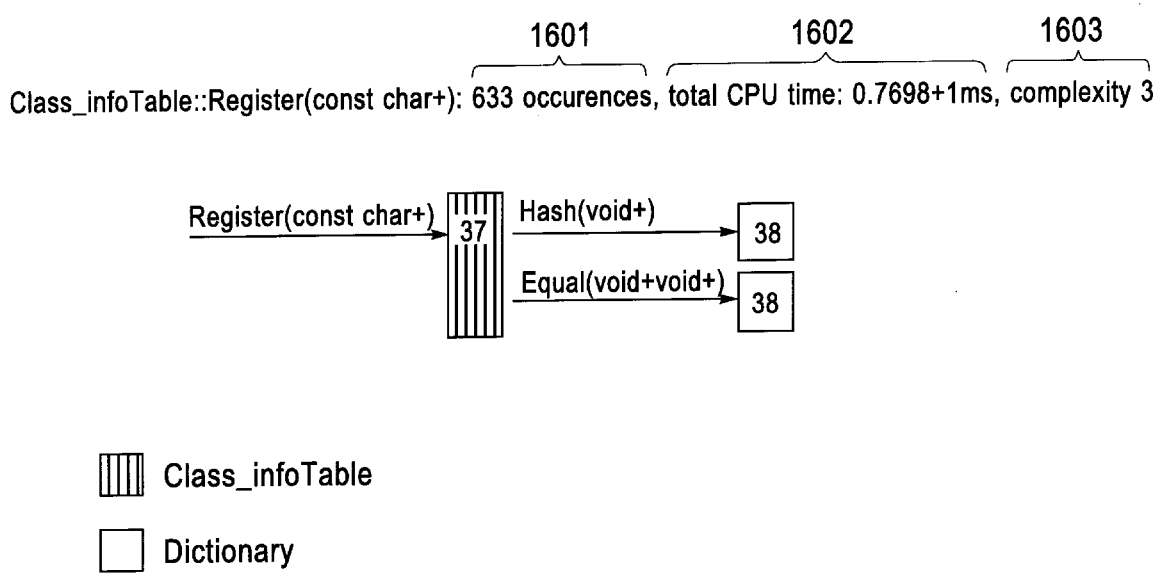
FIG. 16 shows an example of the visualization mechanism for depicting performance and complexity information associated with an execution pattern.

FIG. 16 shows an example of the visualization mechanism for depicting performance and complexity information associated with an execution pattern. Accordingly, the visualization mechanism of the present invention may store performance data in addition to the general execution pattern information discussed. For each pattern, the total number of occurrences and the cumulative CPU time may be recorded. A programmer can use this information to understand where performance tuning will have the greatest payoff. An example of this summary information for a pattern is shown in FIG. 16. It shows the number of occurrences (1601) and the total CPU time (1602) accumulated by all the sequences corresponding to this pattern.

Beyond performance data, the system may also store complexity information for each pattern. Complexity can be measured in different ways. A simple approach might base complexity on the number of different messages in the pattern. This metric would reflect the fact that a pattern comprising an iteration of a thousand identical messages is no harder to modify than one with only five such iterations. For example, the pattern in FIG. 16 has three different messages, giving it a complexity of 3 as shown in (1603). Another option is to measure complexity as the total number of different lines of code that a pattern involves.

Armed with performance and complexity information about the patterns that occur in a program, the user can find those patterns that are time-consuming but still easy to modify. In a preferred embodiment, the system can sort the patterns based on the ratio of cumulative CPU time divided by the first complexity metric defined above.

While we have described our preferred embodiment of the invention, with alternatives, it will be understood that those skilled in the art, both now and in the future, may make various improvements and enhancements which fall within the scope of the appended claims. Accordingly, these claims should be construed to maintain the proper protection for the invention first disclosed.

What is claimed is:

1. A computer system for visualizing execution patterns in an object-oriented program, comprising:

a central processing unit for executing the object-oriented program, said program having a plurality of objects, each object being an instance of a class, ones of the objects communicating by sending messages;

an event collector that collects events to create an event stream representing the messages communicated between the objects; and a visualization mechanism for extracting from the event stream a sequence of messages between said objects and for depicting the sequence visually as a tree wherein a) each of said objects is represented by a respective node of said tree, b) each one of said messages is represented by a respective edge between the objects; and c) one of said objects is visualized as a plurality of nodes for each respective receipt by said object of any of said messages.

2. A computer system as claimed in claim 1, wherein said tree includes a subtree having a plurality of subtree nodes, further comprising means for collapsing said subtree to a collapsed state so that at least one of said subtree nodes is removed from view.

3. A computer system as claimed in claim 2, further comprising means for specifying which of said nodes are to be included in said collapsed subtree.

4. A computer system as claimed in claim 3, wherein the means for specifying comprises graphical means for toggling visualization of said subtree between said collapsed state or an expanded state in which said subtree node removed from view in said collapsed state appears.

5. A computer system as in claim 3, wherein the means for specifying comprises textual means for toggling the node between the collapsed and expanded state based on one of a message identifier and object identifier.

6. A computer system as claimed in claim 1, wherein a root of the tree can be extended by showing the one or more messages and objects that produced the tree.

7. A computer system as claimed in claim 1, further comprising an execution pattern analyzer for classifying one or more execution patterns in the event stream as equivalent message sequences.

8. A computer system as claimed in claim 7, wherein the equivalent message sequences invoke identical methods on identical objects in identical order.

9. A computer system as claimed in claim 7, wherein the equivalent message sequences invoke identical methods in identical order.

10. A computer system as claimed in claim 7, wherein the equivalent message sequences comprise identical messages sent to objects having related classes in identical order.

11. A computer system as claimed in claim 7, wherein the equivalent sequences comprise identical messages sent to related classes of objects in identical order.

12. A computer system as claimed in claim 7, wherein the execution pattern analyzer is adapted for considering a percentage of the execution pattern when classifying the equivalent message sequences.

13. A computer system as claimed in claim 12, wherein the execution pattern analyzer is adapted for disregarding order in the execution pattern when classifying the equivalent message sequences.

14. A computer system as claimed in claim 13, wherein the execution pattern analyzer is adapted for disregarding frequency of repetition in the execution pattern when classifying the equivalent message sequences.

15. A computer system as claimed in claim 7, wherein the visualization mechanism is adapted for depicting an execution pattern reflecting iteration in the program in an abbreviated form.

16. A computer system as claimed in claim 7, wherein the visualization mechanism is adapted for depicting an execution pattern reflecting recursion in the program in an abbreviated form.

17. A computer system as claimed in claim 7, further comprising means for collecting and displaying one of performance information and complexity information about an execution pattern, wherein the performance information is a measure of a resource usage of the corresponding message sequences.

18. A computer system as claimed in claim 17, wherein the complexity information is based on one of a number of different messages in the execution pattern and a total number of different lines of code associated with the execution pattern.

19. A computer system as claimed in claim 18, further comprising means for querying one of the performance information and the complexity information.

20. A computer system as claimed in claim 18, wherein the execution patterns are sorted as a function of the resource usage and the complexity information.

21. In a computer system including a central processing unit executing an object-oriented program, said program having a plurality of objects, each object being an instance of a class, ones of the objects communicating by sending messages, a computerized method for visualizing execution patterns in said object-oriented program, the method comprising the steps of:
   collecting events to create an event stream representing the messages communicated between the objects; and
   extracting from the event stream a sequence of messages between said objects; and
   depicting the sequence visually as a tree wherein
      a) each of said objects is represented by a respective node of said tree,
      b) each one of said messages is represented by a respective edge between the objects; and
      c) one of said objects is visualized as a plurality of nodes for each respective receipt by said object of any of said messages.

22. A method as claimed in claim 21, wherein said tree includes a subtree having a plurality of subtree nodes, further comprising the steps of collapsing said subtree to a collapsed state so that at least one of said subtree nodes is removed from view.

23. A method as claimed in claim 22, further comprising the step of specifying which of said nodes are to be included in said collapsed subtree.

24. A method as claimed in claim 23, wherein the step of specifying comprises the step of toggling visualization of said subtree between said collapsed state or an expanded state in which said subtree node removed from view in said collapsed state appears.

25. A method as in claim 23, wherein the step of specifying is based on one of a message identifier and an object identifier.

26. A method as claimed in claim 21, further comprising the step of extending a root of the tree by showing the one or more messages and objects that produced the tree.

27. A method as claimed in claim 21, further comprising the step of classifying one or more execution patterns in the event stream as equivalent message sequences.

28. A method as claimed in claim 27, wherein the equivalent message sequences invoke identical methods on identical objects in identical order.

29. A method as claimed in claim 27, wherein the equivalent message sequences invoke identical methods in identical order.

30. A method as claimed in claim 27, wherein the equivalent message sequences comprise identical messages sent to objects having related classes in identical order.

31. A method as claimed in claim 27, wherein the equivalent message sequences comprise identical messages sent to related classes of objects in identical order.

32. A method as claimed in claim 27, wherein said step of classifying equivalent message sequences further comprises the step of considering only a percentage X of the execution pattern.

33. A method as claimed in claim 32, wherein said step of classifying equivalent message sequences further comprises the step of disregarding order in the execution pattern.

34. A method as claimed in claim 33, wherein said step of classifying equivalent message sequences further comprises the step of disregarding frequency of repetition in the execution pattern.

35. A method as claimed in claim 27, further comprising the step of depicting an execution pattern reflecting iteration in the program in an abbreviated form.

36. A method as claimed in claim 27, further comprising the step of depicting an execution pattern reflecting recursion in the program in an abbreviated form.

37. A method as claimed in claim 27, further comprising the step of collecting and displaying one of performance information and complexity information about an execution pattern, wherein the performance information is a measure of a resource usage of the corresponding message sequences.

38. A method as claimed in claim 37, wherein the complexity information is based on one of a number of different messages in the execution pattern and a total number of different lines of code associated with the execution pattern.

39. A method as claimed in claim 38, further comprising the step of sorting execution patterns as a function of the performance information or the complexity information.

40. An article of manufacture comprising a computer useable medium having computer readable program code means embodied therein for visualizing execution patterns in one or more object-oriented programs, each program having one or more objects communicating by sending messages, the computer readable program code means in said article of manufacture comprising computer readable program code means for causing a computer to effect:
   collecting one or more events to create an event stream representing the messages communicated between the objects; and
   extracting from the event stream a sequence of one or more messages to an object or between objects; and
   depicting the sequence visually as a tree wherein
      a) each of said objects is represented by a respective node of said tree,
      b) each one of said messages is represented by a respective edge between the objects; and
      c) one of said objects is visualized as a plurality of nodes for each respective receipt by said object of any of said messages.

41. An article of manufacture as recited in claim 40, wherein the computer readable code means in said article of manufacture is further comprising computer readable program code means for causing a computer to effect the step of collapsing said subtree to a collapsed state so that at least one of said subtree nodes is removed from view.

42. An article of manufacture as recited in claim 41, wherein the computer readable code means in said article of manufacture is further comprising computer readable program code means for causing a computer to effect the step of specifying whether one of said nodes in view is associated with said collapsed subtree.

43. A computer program product comprising a computer useable medium having computer readable program code means embodied therein for causing a visualizing of one or more objects communicating by sending messages, the execution patterns in one or more object-oriented programs, each program having computer readable program code means in said computer program product comprising computer readable program code means for causing a computer to effect:

collecting one or more events to create an event stream representing the messages communicated between the objects; and extracting from the event stream a sequence of one or more messages to an object or between objects; and depicting the sequence visually as a tree wherein
- a) each of said objects is represented by a respective node of said tree,
- b) each one of said messages is represented by a respective edge between the objects; and
- c) one of said objects is visualized as a plurality of nodes for each respective receipt by said object of any of said messages.

44. A computer program product as recited in claim 43, wherein said tree includes a subtree having a plurality of subtree nodes, said computer readable program code means in said computer program product comprising computer readable program code means for causing a computer to effect the step of collapsing said subtree to a collapsed state so that at least one of said subtree nodes is removed from view.

45. A computer program product as recited in claim 44, wherein said computer readable program code means is further for causing a computer to effect the step of specifying whether one of said nodes in view is associated with said collapsed subtree.

46. A program storage device readable by machine, tangibly embodying a program of instructions executable by the machine to perform method steps for visualizing execution patterns in one or more object-oriented program, each program having one or more objects communicating by sending messages, the method comprising the steps of:

collecting one or more events to create an event stream representing the messages communicated between the objects; and extracting from the event stream a sequence of one or more messages to an object or between objects; and depicting the sequence visually as a tree wherein
- a) each of said objects is represented by a respective node of said tree,
- b) each one of said messages is represented by a respective edge between the objects; and
- c) one of said objects is visualized as a plurality of nodes for each respective receipt by said object of any of said messages.

47. A program storage device as recited in claim 46, wherein said tree includes a subtree having a plurality of subtree nodes, said program of instructions executable by the machine performing the step of collapsing said subtree to a collapsed state so that at least one of said subtree nodes is removed from view.

48. A program storage device as recited in claim 47, wherein said program of instructions further performs the step of specifying whether one of said nodes in view is associated with said collapsed subtree.

49. A computer system as claimed in claim 48, further comprising means for specifying which of said nodes are to be included in said collapsed subtree.

* * * * *